March 1, 1960 R. W. ERLBACHER 2,926,904
RUBBER FENDER STRUCTURE
Filed June 7, 1957
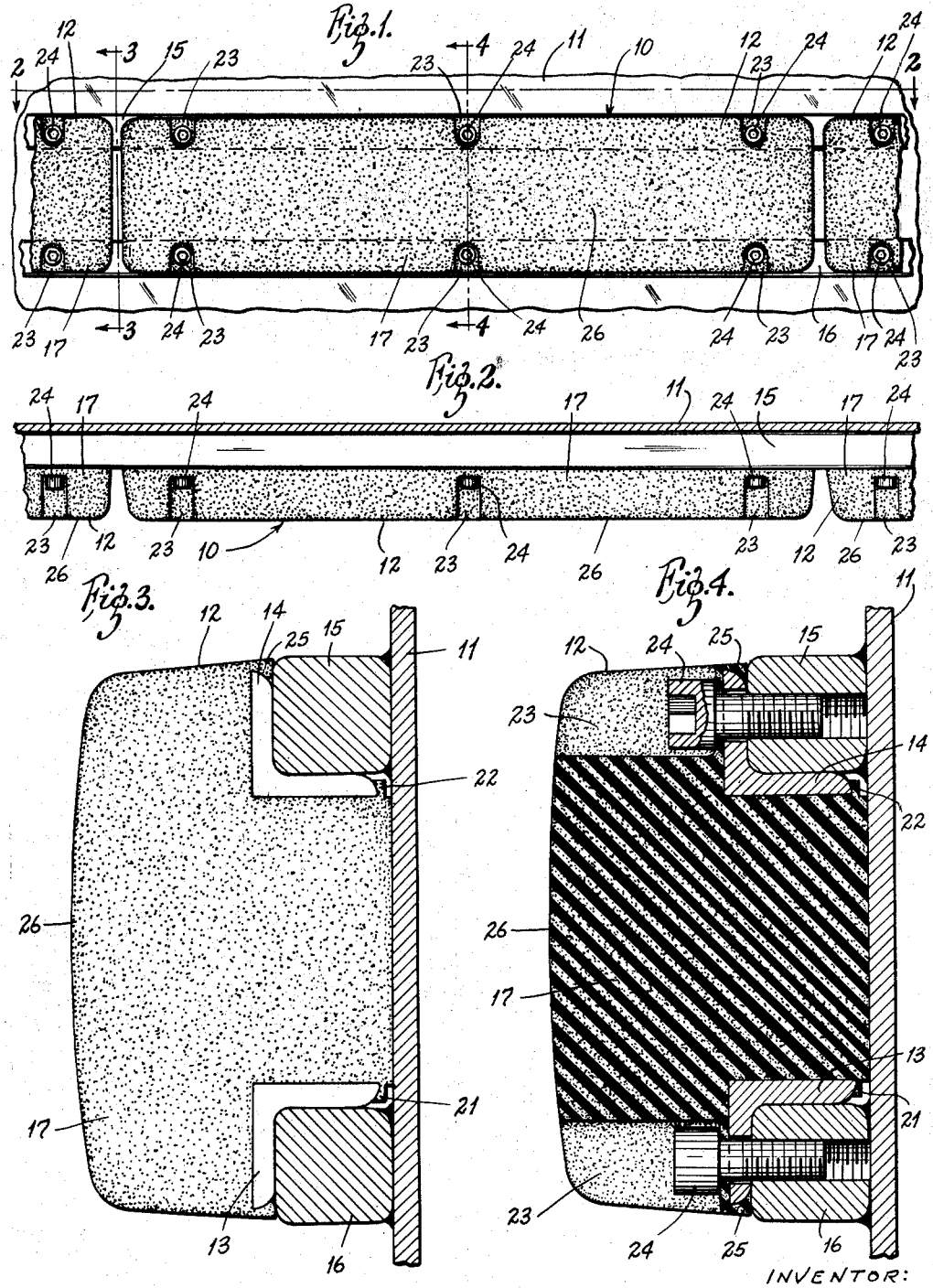
INVENTOR:
ROBERT W. ERLBACHER.
BY Kingsland, Rogers & Ezell
ATTORNEYS

United States Patent Office 2,926,904
Patented Mar. 1, 1960

2,926,904
RUBBER FENDER STRUCTURE
Robert W. Erlbacher, Cape Girardeau, Mo.

Application June 7, 1957, Serial No. 664,243

8 Claims. (Cl. 267—1)

This invention relates to improvements in fender constructions and in particular is concerned with a rubber fender in the form of a strip which may be bonded to metal securing strips and then secured to supporting side rails on the protected structure to which the fender is to be attached.

In the past many different forms of rubber fenders used on marine vessels, wharves, truck docks, vehicles and the like have been employed. It has been a problem to prevent the dislocation or the tearing away of a rubber fender when used due to the difficulty in properly securing it. Further, when installed it has been difficult to provide for removal or maintenance of damaged portions of the fenders.

As a result of the instant invention there has been provided an improved rubber fender which is in the form of a strip and which may be very easily laid down in sections upon supporting rails or tracks affixed to a surface to be protected. The rubber fender strip may be laid down in sections around the sides of a tow boat, as an example, to protect it from damage when mooring against a dock or can be used in the front of a tow boat when pushing barges or other vessels. The sectional aspect of the rubber fender strips makes it possible to lay down the strip very easily or to replace them should they be damaged for one reason or another.

As a further feature of this invention the rubber fender strip is bonded to the supporting strips so that the entire strip may be unitarily handled as a unit. The rubber fender strip is adapted to be very easily secured by conventional bolts to supporting side rails welded to the base structure to which the fender strip is to be attached. The installation, removal or maintenance of the strips can be carried out by relatively unskilled workmen which is of great advantage.

As a further particular consequence of this invention there has been provided a rubber fender strip which is of improved construction in which the rubber fender is supported by its supporting strips in such a manner that when under impact stress a greater securing action is obtained. This is effected by securing the rubber fender to two supporting strips which are in the form of opposed angle irons in such a manner that the base of the fender extends between them.

When the face of the rubber fender is contacted by the object which the fender is designed to protect against, a curved surface of the rubber fender, which is in a somewhat convex configuration, is distorted in such a fashion that the rubber fender is displaced inwardly. This surface which is spoken of as curved is to be understood to include converging flat surfaces. Where desired, a flat surface can also be employed while still obtaining good results. Because of the manner of supporting the fender it is actually under an expansion force against the supporting structure when hit by a relatively moving object which aids in the very tight securing of the fender to the supporting structure.

As a result of this invention there has been provided an improved rubber fender structure which may be used on any surface which is desired to be protected against impact such as the sides of vessels, marine or truck docks, vehicles and the like. The supporting structure may be in the form of supporting rails affixed to a supporting base which receives strips of the rubber fender by recessed bolts which are very easy to manipulate. The entire rubber fender strip and supporting structure are particularly adapted for simple installation, removal, and maintenance.

Accordingly a principal object of this invention is to provide a rubber fender strip which may be secured to supporting rails upon a base to which the fender is to be secured.

A further object of this invention is to provide an improved rubber fender which is bonded or permanently attached to securing strips and in which means are provided to secure the securing strips to supporting rails on a base to which the rubber fender is to be secured.

Still a further object of this invention is to provide an improved rubber fender in which a rubber fender is secured to supporting rails which underlie the face of the rubber fender and are situated at opposed sides of the fender with a central portion of the fender extending between the rails to provide for more secure attachment under stress and compression conditions when the fender is hit or contacted by an object.

Still a further object of this invention is to provide a rubber fender which is bonded to a pair of securing strips situated at opposed sides of the bottom portion of the fender and in which the entire rubber fender is adapted to be attached to supporting rails by attachment of the securing strips to said rails.

Yet a further object of this invention is to provide an improved rubber fender having a generally convex outer face and in which the rubber fender is supported to a base by a supporting rail structure at opposite sides of the bottom of the fender in such a manner that a portion of the rubber fender extends downwardly between the supporting rails to provide for expansion force of the fender against said rails when the face of the fender is compressed by impact.

Still a further object of this invention is to provide an improved rubber fender strip which may be easily secured to supporting rails on a base and in which the fender may be simply removed for maintenance or replacement and the like by relatively unskilled workmen without the requirement of any special tools.

Further objects of this invention will appear in the detailed description which follows and will be further apparent to those skilled in the art.

For the purpose of illustration there is shown in the accompanying drawings a preferred embodiment of this invention. It is to be understood that these drawings are for the purpose of illustration and example only and that the invention is not limited thereto.

In the drawings:

Figure 1 is a view in side elevation of the rubber fender strip secured to a base such as the side of a vessel, dock, etc.;

Figure 2 is a view in section taken on line 2—2 of Figure 1;

Figure 3 is an enlarged view in section taken on line 3—3 of Figure 1 showing the structure of the supporting side rails and the base and the attachment of the fender strip to the base rails; and Figure 4 is an enlarged view in section on line 4—4 of Figure 1 showing details of the means for securing the rubber fender and its bonded securing strip to the supporting side rails and the base to which the fender is to be connected.

The rubber fender is generally indicated by the reference numeral 10 in Figures 1 and 2. As shown therein it is attached to a base 11 which may be the side of a vessel, dock, vehicle or any object to be protected against contact by a relatively moving object.

The rubber fender 10 is comprised of a plurality of rubber fender strips 12 which include bonded securing strips 13 and 14 and supporting side rails 15 and 16 to which the rubber fender strips are adapted to be secured. As shown in Figures 3 and 4 the supporting rails 15 and 16 extend parallel to one another and are adapted to be connected to the base 11 by welding or other suitable means of affixation.

The rubber strip 12 as shown in Figures 3 and 4 employs a specially shaped rubber fender component 17. Securing strips 13 and 14 are bonded by any conventionally known manner to the bottom sides of the rubber fender element 17. The securing strips are in the form of angle irons so that they may rest on the tops of the supporting rails in the manner shown. A substantial portion of the rubber fender element 17 extends downwardly between the two securing strips and also slightly underneath the bottoms of the securing strips at the portions 21 and 22. The extension of the rubber fender underneath the securing strips prevents any contact of the securing strips with the base and tends to eliminate corrosion or rusting together of the securing strips to the base.

It will be further noted, as shown in Figures 1 and 4, that portions of the top sides of the rubber fenders are broken away at the point 23 to provide a countersunk recess for the insertion of bolts 24 through holes provided in the securing strip to attach them to the rails 15 and 16. Further, as shown in Figure 4, a portion of the rubber fender element 17 extends over the tops of the securing strips and at the outside edge as shown at 25. This structure further aids in preventing electrolytic corrosion or rusting or freezing together of the metallic components.

The outside surface of the rubber fender element 17 has a generally convex configuration as indicated by the numeral 26. This construction is of particular significance since glancing blows on the exterior of the fender element will direct a resultant component of force inwardly to displace the rubber fender directly towards the base in a perpendicular direction. This displacement of the rubber fender element 17 toward the base will tend to cause expansion of the bottom of the rubber fender element between the securing strips 13 and 14. Such expansion will further tighten the rubber fender to its securing strip and will urge the securing strips tightly against the sides of the supporting rails 15 and 16. This action under the conditions of greatest stress when objects hit the rubber fender provides for a very effective securing of the rubber fender element and the securing strips to the supporting rails and the base at the moment when a very secure and tight affixation is most needed.

Use

The rubber fender strips 12 are adapted to be very simply secured to the base for connection to the supporting rails 15 and 16. Since the rubber fender strips comprise the unitary rubber fender elements 17 and the bonded securing strips 13 and 14, the work in connecting these sectional strips to the side rails is greatly simplified. The installation merely requires placing the strips onto the supporting rails 15 and 16 in such a manner that the bolts 24 may be screwed through the openings of the securing strips in the recesses 23 into registry with the threaded openings in the supporting rails. The bolts are drawn down tight to complete the securing operation.

When any individual strips are desired to be removed this may be done, as desired, by merely untightening the bolts 24 and removing the selected strip. Thus maintenance or replacement may be very easily effected without disturbing the remaining rubber fender strips.

In actual use the rubber fender withstands the quite considerable wear and tear conventionally encountered extremely well. A very signal feature of the rubber fender is its adaptability to be actually secured to the base in a tighter relationship when it is under the high stress set up by impact with an object against which the base is to be protected. Thus when the relatively moving object hits the face 26 of the rubber fender element 17, either directly or through a glancing blow as is quite often the case, a component of force due to the impact is directed through the rubber fender element perpendicularly with respect to the base 11. This force application causes the compression of the rubber fender element toward the base and such compression necessarily tends to cause expansion laterally at the bottom of the rubber fender element 17 against the side surfaces of the securing strips 13 and 14 due to the inherent elasticity and distortability of the rubber fender element. The expansion forces caused thereby result in greater gripping of the rubber fender on the side surfaces of the securing strips 13 and 14 since they are more tightly moved against the mating side surfaces of the rails 15 and 16. Thus a very secure and tight relationship is effected during the impacting of the rubber fender by any relatively moving object. All of the above features act to provide a very secure and strong supporting structure for the rubber fender.

The provision of the sections 25 of the rubber fender element between the heads of the securing bolts 24 and the top of the securing strips also aids greatly in the securing of the rubber fender to the supporting side rails and protecting against corrosion so that the strip may be easily removed when so desired. As a consequence, any metallic corrosion or freezing together of metal parts is minimized as it will be noted that the rubber strips 25 extend over the ends of the securing strips to protect them against the adverse effects of water, weather and the like. This structure of the strips 25 when coupled with the sealing provision of the elements 21 and 22 at the bottom of the rubber fender and the thin rubber strip directly underlying the heads of the bolts 24, aids greatly in preventing any electrolytic corrosion, rusting or freezing of the metal parts to one another.

Various changes and modifications may be made in this invention as will be apparent to those skilled in the art. Such changes and modifications are within the scope and teaching of this invention as defined by the claims appended hereto.

What is claimed is:

1. A resilient fender device for protecting a surface against damage by relatively moving objects, said fender device comprising a fender element of compressible resilient material connected to underlying spaced longitudinally extending securing strips disposed at opposite sides of said fender element, said resilient material overlying and extending from above said securing strips and between them to about the bottom of said strips and being compressible between said strips when contacted by a relatively moving object to force said securing strips tightly in a vertical and lateral direction against supporting rails fixed to the surface to be protected.

2. A resilient fender device for protecting a surface against damage by relatively moving objects, said fender device comprising a fender element of compressible resilient material connected to underlying spaced longitudinally extending securing strips disposed at opposite sides of said fender element, said resilient material overlying and extending from above said securing strips and between them to about the bottom of said strips and being compressible between said strips when contacted by a relatively moving object to force said securing strips tightly in a vertical and lateral direction against supporting rails fixed to the surface to be protected, said resilient material being further provided with a substantially shallow convexly curved outer surface whereby glancing blows provide a force component directed substantially perpendicularly within the resilient material against said surface to be protected.

3. A resilient fender device for protecting a surface against damage by relatively moving objects, said fender device comprising a fender element of compressible resilient material secured between spaced underlying securing strips, said securing strips secured to substantially parallel, spaced supporting rails fixed to the protected surface, said underlying securing strips being disposed at opposite sides of said fender element in underlying relation and being removably secured to said supporting rails, said strips individually cooperating with the top and inner surfaces of the rails to which they are connected.

4. A resilient fender device for protecting a surface against damage by relatively moving objects, said fender device comprising a fender element of compressible resilient material secured between spaced underlying securing strips, said securing strips being secured to substantially parallel, spaced supporting rails fixed to the protected surface, said underlying securing strips being disposed at opposite sides of said fender element in underlying relation and being removably secured to said supporting rails, said strips individually cooperating with the top and inner surfaces of the rails to which they are connected, said fender element extending from above said securing strips to about the bottom of said strips and being compressible between said strips when contacted by a relatively moving object to force said securing strips tightly in a vertical and lateral direction against said supporting rails.

5. A resilient fender device for protecting a surface against damage by relatively moving objects, said fender device comprising a fender element of compressible resilient material secured between spaced underlying securing strips, said securing strips being secured to substantially parallel, spaced supporting rails fixed to the protected surface, said underlying securing strips being disposed at opposite sides of said fender element in underlying relation and being removably secured to said supporting rails, said strips individually cooperating with the top and inner surfaces of the rails to which they are connected, said fender element extending from above said securing strips to about the bottom of said strips and being compressible between said strips when contacted by a relatively moving object to force said securing strips tightly in a vertical and lateral direction against said supporting rails, said fender element being further provided with a substantially shallow convexly curved outer surface whereby glancing blows provide a force component directed substantially perpendicularly within the fender element against the protected surface.

6. A resilient fender device for protecting a surface against damage by relatively moving objects, said fender device comprising a fender element of compressible resilient material secured between spaced underlying securing strips, said securing strips being secured to substantially parallel, spaced supporting rails fixed to the protected surface, said underlying securing strips being disposed at opposite sides of said fender element in underlying relation and being removably secured to said supporting rails, said strips individually cooperating with the top and inner surfaces of the rails to which they are connected, said fender element being further provided with supplementary gripping elements when it is under compression comprising portions of the fender element expansibly fitting in gripping relation in a recess provided between the bottom of said securing strips, the protected surface and the associated supporting rails.

7. A resilient fender device for protecting a surface against damage by relatively moving objects, said fender device comprising a fender element of compressible resilient material secured between spaced underlying securing strips, said securing strips being secured upon spaced supporting side rails fixed to the surface to be protected, said underlying securing strips being disposed at opposite sides of said fender element in underlying relation and being removably secured to said supporting rails, said strips individually cooperating with the top and inner surfaces of the rails to which they are connected and said fender element being further provided with means for minimizing corrosion and growth of the securing strips to the associated supporting rails comprising portions of said fender element extending over the outer edges of said securing strips and bearing against the top of the rails.

8. A resilient fender device for protecting a surface against damage by relatively moving objects, said fender device comprising a fender element of compressible resilient material secured between spaced underlying securing strips, said securing strips secured upon spaced supporting side rails fixed to the surface to be protected, said underlying securing strips being disposed at opposite sides of said fender element in underlying relation and being removably secured to said supporting rails by bolts countersunk in the fender element and having shanks threadably received in said supporting rails, said strips individually cooperating with the top and inner surfaces of the rails to which they are connected and said fender element being further provided with means for minimizing corrosion and growth of the securing strips to the associated supporting rails comprising portions of said fender element extending between the securing strip and an exposed head of said countersunk bolts and extending over the outer edges of said securing strips and bearing against the top of the rails.

References Cited in the file of this patent

UNITED STATES PATENTS

| | | |
|---|---|---|
| 970,848 | Patronaggio | Sept. 20, 1910 |
| 2,393,161 | Haushalter | Jan. 15, 1946 |
| 2,511,922 | Lacey et al. | June 20, 1950 |
| 2,799,494 | Pollock | July 16, 1957 |

FOREIGN PATENTS

| | | |
|---|---|---|
| 242,539 | Great Britain | Nov. 12, 1925 |